United States Patent
Tseng et al.

(10) Patent No.: US 9,821,802 B1
(45) Date of Patent: Nov. 21, 2017

(54) COMPOSITE AUTONOMOUS DRIVING ASSISTANT SYSTEM FOR MAKING DECISION AND METHOD OF USING THE SAME

(71) Applicant: AUTOMOTIVE RESEARCH & TEST CENTER, Changhua County (TW)

(72) Inventors: Po-Kai Tseng, Changhua County (TW); Shun-Hung Chen, Changhua County (TW)

(73) Assignee: Automotive Research & Test Center, Changhua County (TW)

( * ) Notice: Subject to any disclaimer, the term of this patent is extended or adjusted under 35 U.S.C. 154(b) by 0 days.

(21) Appl. No.: 15/142,462

(22) Filed: Apr. 29, 2016

(51) Int. Cl.
*B60W 30/09* (2012.01)
*B60W 30/12* (2006.01)
*G05D 1/00* (2006.01)

(52) U.S. Cl.
CPC ............ *B60W 30/09* (2013.01); *B60W 30/12* (2013.01); *G05D 1/0088* (2013.01); *B60W 2550/10* (2013.01)

(58) Field of Classification Search
CPC ...... B60W 30/02; B60W 30/04; B60W 30/09; B60W 30/12; B60W 50/14; B60W 2550/10; B62D 1/286
See application file for complete search history.

(56) References Cited

U.S. PATENT DOCUMENTS 6,275,772 B1 *  8/2001  Sugimoto ................. B60T 7/22
                                                      180/169
7,525,475 B2 *  4/2009  Kamping .............. B60T 8/1755
                                                      342/175
(Continued)

FOREIGN PATENT DOCUMENTS

JP        2000168395 A  *  6/2000
JP        2005306362 A  * 11/2005
(Continued)

OTHER PUBLICATIONS

JPO machine translation of JP 2005-310011 (original JP document published Nov. 4, 2005).*

(Continued)

*Primary Examiner* — Behrang Badii
*Assistant Examiner* — David A Testardi
(74) *Attorney, Agent, or Firm* — Rosenberg, Klein & Lee

(57) ABSTRACT

A composite autonomous driving assistant system for making decision and a method of using the same is provided. A longitudinal-controlling autonomous driving assistant device and a lateral-controlling autonomous driving assistant device start to automatically assist in driving a vehicle. Then, a sensing device senses states of the vehicle and an environment and generates one sensing signal. When a controller determines that the collision period is less than a preset collision period and that a deceleration signal of the sensing signal is larger than a preset deceleration, the controller generates a turn-stopping signal. When the con- (Continued)

troller determines that a turn angle signal of the sensing signal is larger than a preset angle, the controller generates a speed-stopping signal. The system establishes a switching threshold condition when the plurality autonomous driving assistant devices coexist.

15 Claims, 3 Drawing Sheets

(56) References Cited

U.S. PATENT DOCUMENTS

| | | | |
|---|---|---|---|
| 2005/0071084 A1* | 3/2005 | Knoop | B60T 7/22 701/301 |
| 2009/0138168 A1* | 5/2009 | Labuhn | B60W 10/10 701/93 |
| 2009/0326820 A1* | 12/2009 | Shimizu | B60T 7/22 701/301 |
| 2012/0101701 A1* | 4/2012 | Moshchuk | B60W 10/184 701/70 |
| 2013/0297172 A1* | 11/2013 | Ariga | G08G 1/166 701/70 |
| 2014/0244131 A1* | 8/2014 | Mielich | B60W 30/12 701/99 |
| 2015/0166059 A1* | 6/2015 | Ko | B60W 30/09 701/28 |
| 2015/0217807 A1* | 8/2015 | Schumacher | B60W 50/10 701/41 |
| 2015/0251664 A1* | 9/2015 | Zagorski | B62D 6/003 701/41 |
| 2016/0103449 A1* | 4/2016 | Desnoyer | B60W 30/12 701/23 |

FOREIGN PATENT DOCUMENTS

| | | | |
|---|---|---|---|
| JP | 2005310011 A | * | 11/2005 |
| JP | 2006273252 A | * | 10/2006 |
| JP | 2012121534 A | * | 6/2012 |
| JP | 2014091380 A | * | 5/2014 |
| JP | 2014117976 A | * | 6/2014 |

OTHER PUBLICATIONS

JPO machine translation of JP 2014-117976 (original JP document published Jun. 30, 2014).*

* cited by examiner

COMPOSITE AUTONOMOUS DRIVING ASSISTANT SYSTEM FOR MAKING DECISION AND METHOD OF USING THE SAME

BACKGROUND OF THE INVENTION

Field of the Invention

The present invention relates to an autonomous driving assistant technology, particularly to a composite autonomous driving assistant system for making decision and a method of using the same. The system switches autonomous assistant driving required according to an environment.

Description of the Related Art

An autonomous driving assistant system can use distance or image sensing devices to sense an external environment of a vehicle body so that a processor generates a control vehicle body signal according to the external environment, so as to control the state that the vehicle body moves on. As a result, the autonomous driving assistant system can assist in driving the vehicle, thereby improving driving and road safety and reducing workload for long-term driving.

In the United States, the National Highway Traffic Safety Administration (NHTSA) of Department of Transportation (DOT) has proposed a formal classification system: The following pertains to automated vehicles. Level 0: No automation. Level 1: Function-specific automation. Level 2: Combined function automation. Level 3: Vehicles at this level of automation enable the driver to cede full control of all safety-critical functions under certain traffic or environmental conditions and in those conditions to rely heavily on the vehicle to monitor for changes in those conditions requiring transition back to driver control. Level 4: Full self-driving automation.

The longitudinal-controlling autonomous assistant system is used to control a longitudinal acceleration, a longitudinal deceleration, a speed, a relative speed, a relative acceleration and a relative deceleration of the vehicle body. For example, an autonomous emergency braking system (AEB) uses precise sensor and electrical equipment to determine whether there are objects in front of the vehicle. If the system determines that a collision possibly occurs, the system automatically makes a quick stop. The lateral-controlling autonomous assistant system is used to control a steering wheel angle, a heading angle, a sideslip angle, a lateral acceleration, a lateral speed and a steering wheel angular speed of the vehicle body. A lane keeping system (LKS) belongs to the lateral-controlling autonomous assistant system. The LKS uses a lens of a charge-coupled device (CCD) in front of the vehicle to catch an image of a lane to calculate a vehicle deviation. When a driver deviates from the lane, the system warns and provides turning control to assist the driver in driving within the lane.

However, when only one autonomous assistant system is installed on the vehicle, the autonomous assistant system is shut down as long as a steering wheel, a throttle or a brake is driven. In the future, the autonomous assistant system will develop toward Level 3, namely combined autonomous assistant systems. When multiple autonomous assistant systems are installed on a vehicle, its situation is not simple. When a longitudinal-controlling autonomous assistant system and a lateral-controlling autonomous assistant system are installed on a vehicle, the vehicle is in the following dangerous situation without using conversion mechanism between the longitudinal-controlling autonomous assistant system and the lateral-controlling autonomous assistant system. When the vehicle corners too much, the longitudinal-controlling autonomous assistant system and the lateral-controlling autonomous assistant system simultaneously start whereby the vehicle turns over and deviates from the lane to cause greater damage. As a result, how to make the longitudinal-controlling autonomous assistant system and the lateral-controlling autonomous assistant system coexist and define a switching threshold condition for the two autonomous driving assistant systems is very important.

To overcome the abovementioned problems, the present invention provides a composite autonomous driving assistant system for making decision and a method of using the same, so as to solve the afore-mentioned problems of the prior art.

SUMMARY OF THE INVENTION

A primary objective of the present invention is to provide a composite autonomous driving assistant system for making decision and a method of using the same, which efficiently makes a longitudinal-controlling autonomous driving assistant device and a lateral-controlling autonomous driving assistant device coexist and defines a threshold condition for two different autonomous driving assistant devices, and which determines that the longitudinal-controlling autonomous driving assistant device or the lateral-controlling autonomous driving assistant device has to shut down at present according to states of a vehicle and an environment, thereby improving autonomous driving safety.

Another objective of the present invention is to provide a composite autonomous driving assistant system for making decision and a method of using the same, which shuts down or starts autonomous assistant driving according to the driver's will, so as to control dominance of driving a vehicle, thereby improving driving safety.

To achieve the abovementioned objectives, the present invention provides a composite autonomous driving assistant system for making decision arranged on a vehicle to automatically assist in driving the vehicle, and the composite autonomous driving assistant system for making decision comprises: a longitudinal-controlling autonomous driving assistant device controlling a moving speed of the vehicle; a lateral-controlling autonomous driving assistant device controlling a turning angle of the vehicle; a sensing device sensing states of the vehicle and an environment and generating at least one sensing signal comprising a speed signal, a distance signal, a turn angle signal and a deceleration signal; and a controller electrically connected with the longitudinal-controlling autonomous driving assistant device, the lateral-controlling autonomous driving assistant device and the sensing device, receiving the sensing signal and figuring out a collision period according to the speed signal and the distance signal. When the controller determines that the collision period is less than a preset collision period and that the deceleration signal is larger than a preset deceleration, the controller generates a turn-stopping signal and transmits the turn-stopping signal to the lateral-controlling autonomous driving assistant device to stop controlling the turning angle of the vehicle. When the controller determines that the turn angle signal is larger than a preset angle, the controller generates a speed-stopping signal whereby the longitudinal-controlling autonomous driving assistant device stops controlling the moving speed of the vehicle.

The longitudinal-controlling autonomous driving assistant device is an autonomous emergency braking system (AEB) or an adaptive cruise control (ACC). The lateral-controlling autonomous driving assistant device is a lane keeping system (LKS) or a lane following control (LFC).

The sensing device further comprises: a speed sensor sensing a speed of the vehicle to generate the speed signal and the deceleration signal and transmitting the speed signal and the deceleration signal to the controller; a turning sensor sensing a turning angle of the vehicle to generate the turn angle signal and transmitting the turn angle signal to the controller; and a ranging sensor sensing a distance to a front obstruction to generate the distance signal and transmitting the distance signal to the controller.

The present invention also provides a composite autonomous driving assistant method for making decision. Firstly, in Step (A), a longitudinal-controlling autonomous driving assistant device and a lateral-controlling autonomous driving assistant device start to automatically assist in driving a vehicle. Then, in Step (B), states of the vehicle and an environment are sensed and at least one sensing signal comprising a speed signal, a distance signal, a turn angle signal and a deceleration signal is generated, wherein the speed signal and the distance signal are used to figure out a collision period. Then, in Step (C), decision is made to determine whether to shut down the longitudinal-controlling autonomous driving assistant device or the lateral-controlling autonomous driving assistant device. Step (C1) further comprises Step (C12) of determining whether the collision period is less than the preset collision period: if no, returning Step (B); and if yes, determining whether the deceleration signal is larger than the preset deceleration: if yes, generating the turn-stopping signal and transmitting the turn-stopping signal to the lateral-controlling autonomous driving assistant device to stop controlling the turning angle of the vehicle; and if no, returning Step (B). When Step (C1) is performed, the process performs Step (C2) of determining whether the turn angle signal is larger than a preset angle: if yes, generating a speed-stopping signal and transmitting the speed-stopping signal the longitudinal-controlling autonomous driving assistant device to stop controlling a moving speed of the vehicle; and if no, returning the Step (B).

Below, the embodiments are described in detail in cooperation with the drawings to make easily understood the technical contents, characteristics and accomplishments of the present invention.

DETAILED DESCRIPTION OF THE INVENTION

Figure 1:
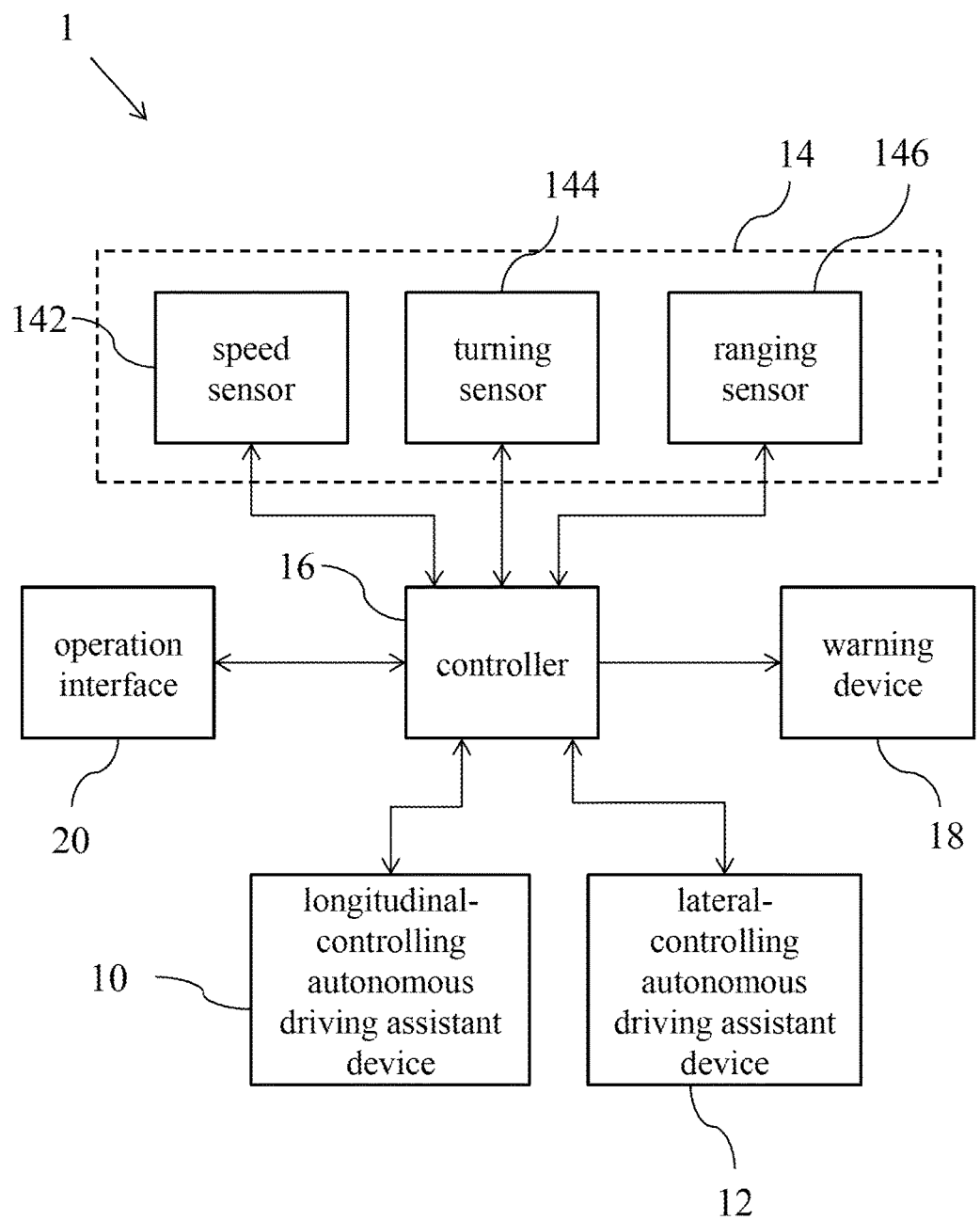
FIG. 1 is a block diagram schematically showing a composite autonomous driving assistant system for making decision according to an embodiment of the present invention.

Refer to FIG. 1. FIG. 1 is a block diagram schematically showing a composite autonomous driving assistant system for making decision 1 arranged on a vehicle to automatically assist in driving the vehicle. The composite autonomous driving assistant system for making decision 1 comprises a controller 16 electrically connected with a longitudinal-controlling autonomous driving assistant device 10, a lateral-controlling autonomous driving assistant device 12, a sensing device 14, a warning device 18 and an operation interface 20. The longitudinal-controlling autonomous driving assistant device 10 is used to control a moving speed of the vehicle. The longitudinal-controlling autonomous driving assistant device 10 is an autonomous emergency braking system (AEB) or an adaptive cruise control (ACC) to control a longitudinal acceleration, a longitudinal deceleration, a speed, a relative speed, a relative acceleration and a relative deceleration of the vehicle. The lateral-controlling autonomous driving assistant device 12 is used to control a turning angle of the vehicle. The lateral-controlling autonomous driving assistant device 12 is a lane keeping system (LKS) or a lane following control (LFC), so as to control a steering wheel angle, a heading angle, a sideslip angle, a lateral acceleration, a lateral speed and a steering wheel angular speed of the vehicle.

The sensing device 14 is used to sense states of the vehicle and an environment and generate at least one sensing signal comprising a speed signal, a distance signal, a turn angle signal and a deceleration signal. The sensing device 14 further comprises a speed sensor 142, a turning sensor 144 and a ranging sensor 146, which are all electrically connected with the controller 16. The speed sensor 142 senses a speed of the vehicle to generate the speed signal and the deceleration signal. The turning sensor 144 senses a turning angle of the vehicle to generate the turn angle signal. The ranging sensor 146 can emit a radar signal to a distance to a front obstruction to generate the distance signal.

The controller 16 receives the sensing signal of the sensing device 14 and figures out a collision period according to the speed signal generated by the speed sensor 142 and the distance signal generated by the ranging sensor 146, whereby the controller 16 determines whether the collision period is less than a preset collision period. Simultaneously, the controller 16 determines whether the deceleration signal generated by the speed sensor 142 is larger than a preset deceleration. When the collision period is less than the preset collision period and the deceleration signal is larger than the preset deceleration, the controller 16 generates a turn-stopping signal and transmits the turn-stopping signal to the lateral-controlling autonomous driving assistant device 12 to stop controlling the turning angle of the vehicle. When the collision period is less than the preset collision period, the controller 16 generates a reminding signal and transmits the reminding signal to the warning device 18 to warn a driver. When the collision period is less than a preset warning collision period, the controller 16 generates a turn-stopping warning signal and transmits the turn-stopping warning signal to the warning device 18, so as to warn the driver of the fact that the lateral-controlling autonomous driving assistant device 12 is shutting down whereby the driver is careful at all times.

Besides, the controller 16 simultaneously determines whether the turn angle signal is larger than a preset angle. When the turn angle signal is larger than the preset angle, the controller 16 generates a speed-stopping signal and transmits the speed-stopping signal to the longitudinal-controlling autonomous driving assistant device 10 whereby the longitudinal-controlling autonomous driving assistant device 10 stops controlling the moving speed of the vehicle. When the controller 16 generates the speed-stopping signal, the controller 16 generates a speed-stopping warning signal and transmits the speed-stopping warning signal to the warning device 18, so as to warn the driver of the fact that the longitudinal-controlling autonomous driving assistant device 10 shut down.

The operation interface 20 provides an automation over-ride control signal to the controller 16 to generate the speed-stopping signal and the turn-stopping signal, so as to shut down the longitudinal-controlling autonomous driving assistant device 10 or the lateral-controlling autonomous driving assistant device 12, whereby autonomous assistant driving shuts down and the driver regains dominance of driving the vehicle at all times. When autonomous assistant driving malfunctions, manned driving dominates to serve as a safety mechanism.

Figure 2:
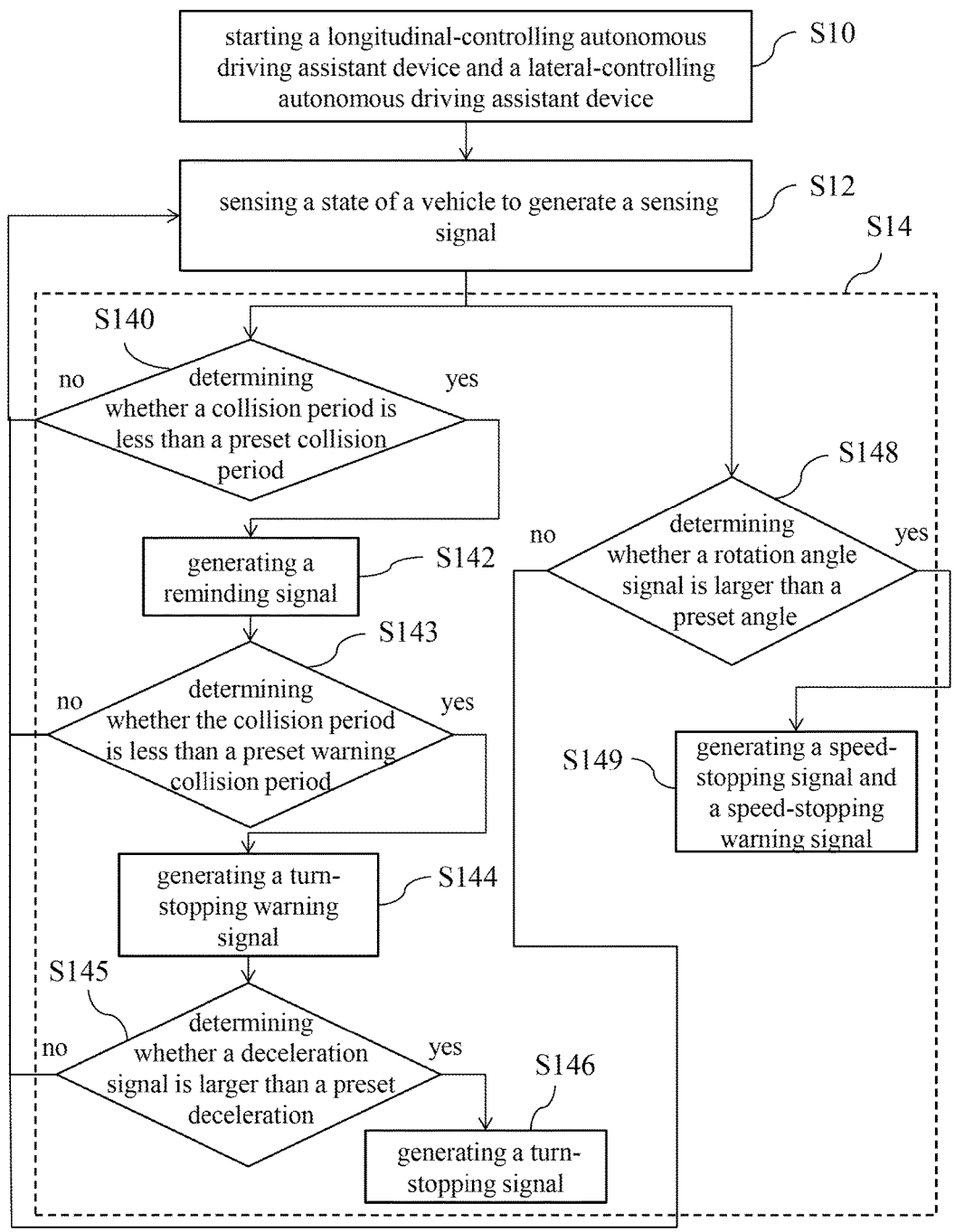
FIG. 2 is a flowchart schematically showing a composite autonomous driving assistant method for making decision according to an embodiment of the present invention.
Figure 3:
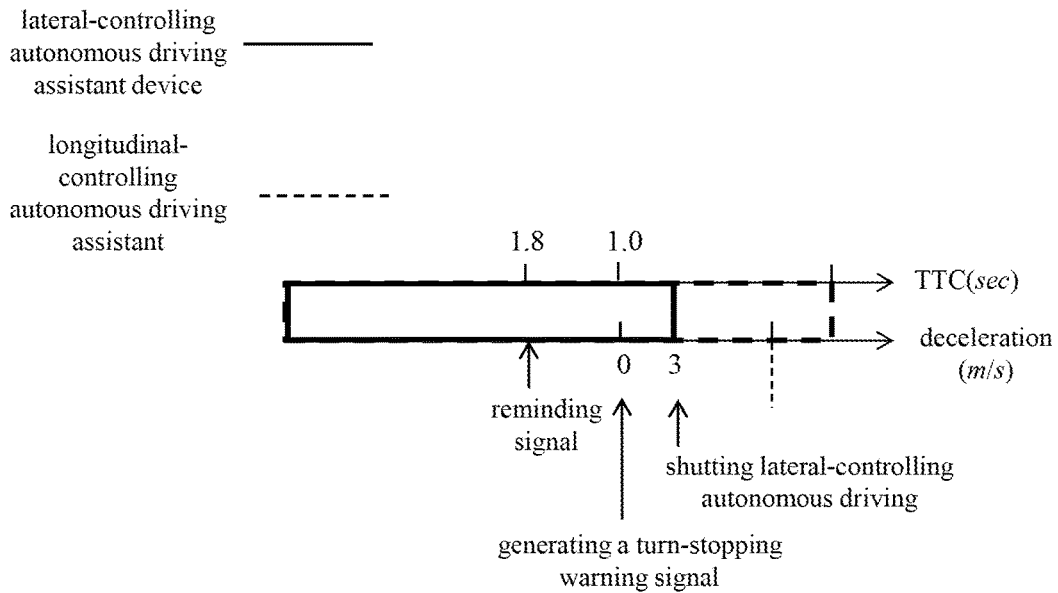
FIG. 3 and FIG. 4 are diagrams schematically showing conversion for a longitudinal-controlling autonomous driving assistant device and a lateral-controlling autonomous driving assistant device according to an embodiment of the present invention.

After explaining the system of the present invention, the flowchart of the present invention is explained. Refer to FIG. 1 and FIG. 2. Firstly, in Step S10, the longitudinal-controlling autonomous driving assistant device 10 and the lateral-controlling autonomous driving assistant device 12 start to automatically assist in driving the vehicle. Then, in Step S12, the sensing device 14 senses the states of the vehicle and the environment to generate at least one sensing signal which comprises a speed signal, a distance signal, a turn angle signal and a deceleration signal, wherein the controller 16 uses the speed signal and the distance signal to figure out the collision period. Then, in Step S14, the controller 16 makes decision to determine whether to shut down the longitudinal-controlling autonomous driving assistant device 10 or the lateral-controlling autonomous driving assistant device 12. Refer to FIG. 1, FIG. 2 and FIG. 3. In Step S14, Step S140 is firstly performed. In Step S140, the controller 16 determines whether the collision period is less than the preset collision period. For example, the preset collision period is 2-1.8 seconds, preferably 1.8 seconds, but the present invention is not limited thereto. When the controller 16 determines that the collision period is not less than the preset collision period, the process returns to Step S12. When the controller 16 determines that the collision period is less than the preset collision period, the process proceeds to Step S142. In Step S142, the controller 16 generates the reminding signal and transmits the reminding signal to the warning device 18 to alert the driver. Then, the process proceeds to Step 143. In Step S143, the controller 16 determines whether the collision period is less than the preset warning collision period. For example, the preset warning collision period is 1.2-1 second, preferably 1 second. When the controller 16 determines that the collision period is not less than the preset warning collision period, the process returns to Step S12. When the controller 16 determines that the collision period is less than the preset warning collision period, the process proceeds to Step S144. In Step S144, the controller 16 generates a turn-stopping warning signal and transmits the turn-stopping warning signal to the warning device 18 to warn the driver of the fact that the lateral-controlling autonomous driving assistant device 12 is shutting down. Then, the process proceeds to Step S145. In Step S145, the controller 16 determines whether the deceleration signal is larger than the preset deceleration. For example, the preset deceleration is 2-4 m/s, preferably 3 m/s, but the present invention is not limited thereto. When the deceleration signal is larger than the preset deceleration, the process proceeds to Step S146. In Step S146, the controller 16 generates the turn-stopping signal and transmits the turn-stopping signal to the lateral-controlling autonomous driving assistant device 12. When the deceleration signal is not larger than the preset deceleration, the process returns to Step 12.

Figure 4:
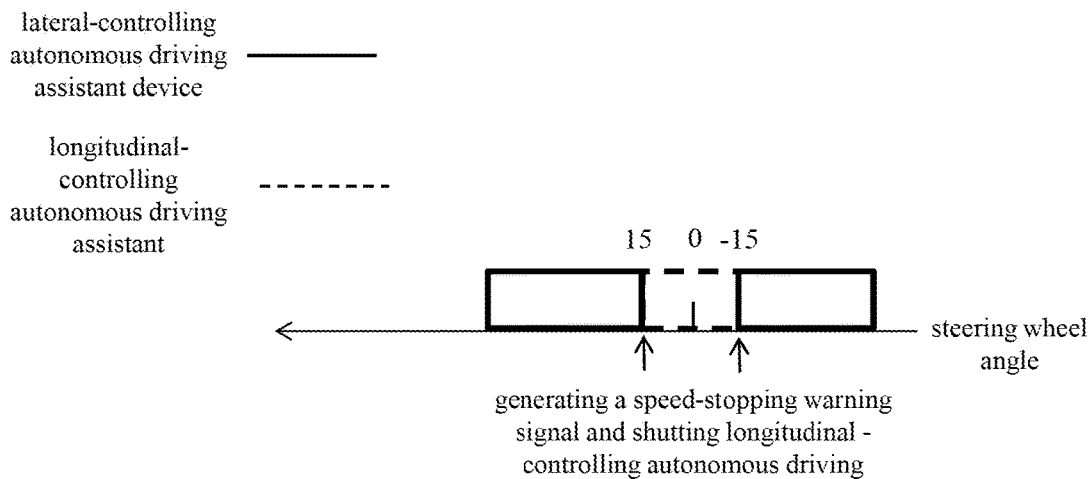

Then, the present invention explains Step S148. Refer to FIG. 1, FIG. 2 and FIG. 4. In Step S148, the controller 16 determines whether the turn angle signal is larger than a preset angle ranging 15-20 degrees. For example, the preset angle is 15 degrees in the embodiment, but the present invention is not limited thereto. When the turn angle signal is larger than the preset angle, the process proceeds to Step S149. In Step S149, the controller 16 generates the speed-stopping signal and transmits the speed-stopping signal to the longitudinal-controlling autonomous driving assistant device 10 whereby the longitudinal-controlling autonomous driving assistant device 10 stops controlling the moving speed of the vehicle. Meanwhile, the controller 16 generates the speed-stopping warning signal and transmits the speed-stopping warning signal to the warning device 18, so as to warn the driver of the fact that the longitudinal-controlling autonomous driving assistant device 10 shut down. When the turn angle signal is less than the preset angle, the process proceeds to Step S12 to sense the state of the vehicle again.

After receiving the reminding signal, the speed-stopping warning signal and the turn-stopping warning signal generated by the warning device 18, the operation interface 20 provides an automation over-ride control signal to generate the speed-stopping signal and the turn-stopping signal, so as to shut down the longitudinal-controlling autonomous driving assistant device 10 or the lateral-controlling autonomous driving assistant device 12, thereby shutting down autonomous assistant driving whereby the driver regains dominance of driving. The activity can serve as a safety mechanism. Certainly, the operation interface 20 provides the automation over-ride control signal to be available at all times to shut down autonomous assistant driving whereby the driver regains dominance of driving at all times.

In conclusion, the present invention efficiently makes the longitudinal-controlling autonomous driving assistant device and the lateral-controlling autonomous driving assistant device coexist, defines a threshold condition for switching two different autonomous driving assistant devices, shuts down the longitudinal-controlling autonomous driving assistant device or the lateral-controlling autonomous driving assistant device according to the states of the vehicle and the environment, thereby improving autonomous driving safety. The present invention shuts down or starts autonomous assistant driving according to the driver's will. When the driver observes misjudgments and danger of autonomous assistant driving, the driver can regain dominance of driving, thereby greatly improving driving safety.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:

1. A composite autonomous driving assistant system for decision making arranged on a vehicle to automatically assist in driving said vehicle, and said composite autonomous driving assistant system for decision making comprising:
   a longitudinal-controlling autonomous driving assistant subsystem controlling a moving speed of said vehicle;
   a lateral-controlling autonomous driving assistant subsystem controlling a turning angle of said vehicle;
   a sensing subsystem sensing states of said vehicle and an environment and generating at least one sensing signal including a speed signal, a distance signal, a turn angle signal and a deceleration signal; and a controller electrically connected with said longitudinal-controlling autonomous driving assistant subsystem, said lateral-controlling autonomous driving assistant subsystem, and said sensing subsystem, said controller receiving said sensing signal and computing a collision period according to said speed signal and said distance signal, and when said controller determines said collision period to be less than a preset collision period and said deceleration signal to be larger than a preset deceleration, said controller generates a turn-stopping signal and transmits said turn-stopping signal to said lateral-controlling autonomous driving assistant subsystem to stop controlling said turning angle of said vehicle; and when said controller receives and determines said turn angle signal to be larger than a preset angle, said controller generates a speed-stopping signal whereby said longitudinal-controlling autonomous driving assistant subsystem stops controlling said moving speed of said vehicle;

wherein said lateral-controlling autonomous driving assistant subsystem is selectively stopped based on the moving speed of said vehicle as controlled by said longitudinal-controlling autonomous driving assistant subsystem, and said longitudinal-controlling autonomous driving assistant subsystem is selectively stopped based on the turn angle signal as said vehicle is being controlled by said lateral-controlling autonomous driving assistant subsystem.

2. The composite autonomous driving assistant system for decision making of claim 1, wherein said longitudinal-controlling autonomous driving assistant subsystem is an autonomous emergency braking system (AEB) or an adaptive cruise control (ACC).

3. The composite autonomous driving assistant system for decision making of claim 1, wherein said lateral-controlling autonomous driving assistant subsystem is a lane keeping system (LKS) or a lane following control (LFC).

4. The composite autonomous driving assistant system for decision making of claim 1, wherein said sensing subsystem further comprises:
   a speed sensor sensing a speed of said vehicle to generate said speed signal and said deceleration signal and transmitting said speed signal and said deceleration signal to said controller;
   a turning sensor sensing said turning angle of said vehicle to generate said turn angle signal and transmitting said turn angle signal to said controller; and
   a ranging sensor sensing a distance to a front obstruction to generate said distance signal and transmitting said distance signal to said controller.

5. The composite autonomous driving assistant system for decision making of claim 1, wherein when said controller determines that said collision period is less than said preset collision period, said controller generates a reminding signal; when said controller determines that said collision period is less than a preset warning collision period, said controller generates a turn-stopping warning signal to warns that said lateral-controlling autonomous driving assistant subsystem is shutting down; when said controller generates said speed-stopping signal, said controller generates a speed-stopping warning signal to warn that said longitudinal-controlling autonomous driving assistant subsystem is shutting down.

6. The composite autonomous driving assistant system for decision making of claim 5, further comprising a warning device electrically connected with said controller, receiving said reminding signal, said turn-stopping warning signal and said speed-stopping warning signal, and correspondingly warning according to said reminding signal, said turn-stopping warning signal and said speed-stopping warning signal.

7. The composite autonomous driving assistant system for decision making of claim 1, further comprising an operation interface electrically connected with said controller and providing an automation over-ride control signal to said controller to generate said speed-stopping signal and said turn-stopping signal, so as to shut down said longitudinal-controlling autonomous driving assistant subsystem or said lateral-controlling autonomous driving assistant subsystem, wherein said operation interface is operable by a driver of said vehicle.

8. A composite autonomous driving assistant method for decision making comprising:
   (A): starting a longitudinal-controlling autonomous driving assistant subsystem and a lateral-controlling autonomous driving assistant subsystem to automatically assist in driving a vehicle;
   (B): sensing states of said vehicle and an environment and generating at least one sensing signal comprising a speed signal, a distance signal, a turn angle signal and a deceleration signal, wherein said speed signal and said distance signal are used to calculate a collision period; and
   (C): making decision to determine whether to selectively shut down said longitudinal-controlling autonomous driving assistant subsystem based on the turn angle signal as said vehicle is being controlled by said lateral-controlling autonomous driving assistant subsystem or to selectively shut down said lateral-controlling autonomous driving assistant subsystem based on a moving speed of said vehicle as controlled by said longitudinal-controlling autonomous driving assistant subsystem:
   (C1): determining whether said collision period is less than a preset collision period;
   when said collision period is greater than a preset collision period, returning said operation (B);
   (C11): when said collision period is less than a preset collision period; determining whether said deceleration signal is larger than a preset deceleration:
      when said deceleration signal is larger than a preset deceleration, generating a turn-stopping signal and transmitting said turn-stopping signal to said lateral-controlling autonomous driving assistant subsystem to stop controlling a turning angle of said vehicle; and
      when said deceleration signal is smaller than a preset deceleration, returning said operation (B);
   (C2): determining whether said turn angle signal is larger than a preset angle:
      when said turn angle signal is larger than a preset angle, generating a speed-stopping signal and transmitting said speed-stopping signal said longitudinal-controlling autonomous driving assistant subsystem to stop controlling said moving speed of said vehicle; and
      when said turn angle signal is smaller than a preset angle, returning said operation (B).

9. The composite autonomous driving assistant method for decision making of claim 8, wherein said longitudinal-controlling autonomous driving assistant subsystem includes an autonomous emergency braking system (AEB) or an adaptive cruise control (ACC).

10. The composite autonomous driving assistant method for decision making of claim 8, wherein said lateral-controlling autonomous driving assistant subsystem includes a lane keeping system (LKS) or a lane following control (LFC).

11. The composite autonomous driving assistant method for decision making of claim 8, wherein said operation (C11) further includes operation (C12): determining whether said collision period is less than said preset warning collision period:
- when said collision period is greater than said preset warning collision period, returning operation (B); and
- when said collision period is less than said preset warning collision period, determining whether said deceleration signal is larger than said preset deceleration:
- when said deceleration signal is larger than said preset deceleration, generating said turn-stopping signal and transmitting said turn-stopping signal to said lateral-controlling autonomous driving assistant subsystem to stop controlling said turning angle of said vehicle; and
- when said deceleration signal is smaller than said preset deceleration, returning operation (B).

12. The composite autonomous driving assistant method for decision making of claim 11, wherein in said operation (C1) of determining whether said collision period is less than said preset collision period, a reminding signal is generated when said collision period is less than said preset collision period.

13. The composite autonomous driving assistant method for decision making of claim 12, wherein in said operation (C12) of determining whether said collision period is less than said preset warning collision period, a turn-stopping warning signal is generated to warn that said lateral-controlling autonomous driving assistant subsystem is shutting down when said collision period is less than a preset warning collision period.

14. The composite autonomous driving assistant method for decision making of claim 12, wherein after generating said reminding signal in operation (C1), an automation over-ride control signal is activated by a driver of said vehicle to generate said speed-stopping signal and said turn-stopping signal, so as to shut down said longitudinal-controlling autonomous driving assistant subsystem or said lateral-controlling autonomous driving assistant subsystem.

15. The composite autonomous driving assistant method for decision making of claim 8, wherein in operation (C2), a speed-stopping warning signal is generated to warn that said longitudinal-controlling autonomous driving assistant subsystem shut down when said speed-stopping signal is generated.

* * * * *